(12) United States Patent
Couture et al.

(10) Patent No.: US 9,272,787 B2
(45) Date of Patent: Mar. 1, 2016

(54) FLOW REDUCTION FOR BLEED AIR SYSTEMS

(71) Applicant: Hamilton Sundstrand Corporation, Windsor Locks, CT (US)

(72) Inventors: Lyndsay Morgan Couture, West Hartford, CT (US); Erin G. Kline, Vernon, CT (US); Jeffrey Ernst, Wethersfield, CT (US); Antonio G. Daniele, Granby, CT (US); Hong Liang, Suffield, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 379 days.

(21) Appl. No.: 13/862,109

(22) Filed: Apr. 12, 2013

(65) Prior Publication Data

US 2014/0130883 A1 May 15, 2014

Related U.S. Application Data

(60) Provisional application No. 61/722,646, filed on Nov. 5, 2012.

(51) Int. Cl.
 *G05D 16/02* (2006.01)
 *B64D 13/00* (2006.01)
 *G05D 7/06* (2006.01)

(52) U.S. Cl.
 CPC .............. *B64D 13/00* (2013.01); *G05D 7/0647* (2013.01); *Y10T 137/0379* (2015.04); *Y10T 137/7758* (2015.04)

(58) Field of Classification Search
 CPC .............. B64D 13/00; Y10T 137/0379; Y10T 137/7758; G05D 7/0647
 See application file for complete search history.

(56) References Cited

U.S. PATENT DOCUMENTS

| 4,262,495 | A | * | 4/1981 | Gupta et al. ..................... 62/402 |
| 4,347,570 | A | * | 8/1982 | Akiyama et al. .............. 701/102 |
| 4,364,357 | A | * | 12/1982 | Matsuoka ...................... 123/699 |
| 4,374,469 | A | * | 2/1983 | Rannenberg .................... 62/402 |
| 4,376,369 | A | * | 3/1983 | Horikoshi et al. .............. 60/276 |
| 4,829,960 | A | * | 5/1989 | Yuzawa et al. ................ 477/111 |
| 4,840,036 | A | * | 6/1989 | Spraker, Jr. ..................... 62/172 |
| 4,966,005 | A | * | 10/1990 | Cowell et al. .................... 62/79 |
| 5,394,697 | A | * | 3/1995 | Hirata ............................ 60/426 |
| 6,124,646 | A | * | 9/2000 | Artinian et al. ................. 290/52 |
| 6,295,822 | B1 | * | 10/2001 | Mueller ......................... 62/172 |
| 8,192,532 | B1 | * | 6/2012 | Gupta ............................ 95/288 |
| 2007/0023577 | A1 | * | 2/2007 | Jones ........................ 244/135 R |
| 2008/0000531 | A1 | * | 1/2008 | Robb et al. .................... 137/488 |
| 2008/0060523 | A1 | * | 3/2008 | Tom et al. ...................... 96/109 |
| 2010/0310392 | A1 | * | 12/2010 | Lippold et al. ................ 417/405 |
| 2013/0152615 | A1 | * | 6/2013 | Lee et al. ........................ 62/241 |

* cited by examiner

*Primary Examiner* — Ramesh Patel
(74) *Attorney, Agent, or Firm* — Kinney & Lange, P.A.

(57) ABSTRACT

A valve control system includes a valve connected to regulate flow of a medium provided to an output and a sensor connected to monitor a feedback value associated with the medium. A controller modulates the valve based on a comparison of a reference value to the feedback value provided by the sensor. The controller detects saturation of the valve if the error between the monitored feedback value and reference value exceeds a threshold. In response to detected saturation, the controller reduces the reference value to a value less than the monitored feedback value.

17 Claims, 2 Drawing Sheets

_US 9,272,787 B2_

FLOW REDUCTION FOR BLEED AIR SYSTEMS

CROSS-REFERENCE TO RELATED APPLICATION(S)

The present application claims priority to U.S. Provisional Patent Application Ser. No. 61/722,646, entitled "Flow Reduction for Bleed air Systems," filed Nov. 5, 2012, which is hereby incorporated by reference in its entirety.

BACKGROUND

The present invention is related to bleed air systems employed on aircraft, and in particular to the control of valves employed in bleed air systems.

Bleed air in gas turbine engines is compressed air taken, typically, from the compressor stage of the engine. Bleed air is utilized in a variety of applications on the aircraft, including de-icing operations, as pneumatic power for actuators, and as an input to environmental control systems (ECS) used to provide conditioned air to the cabin.

Control valves are utilized throughout the aircraft to control the flow of bleed air to various loads. Pressure and/or flow sensors monitor the pressure/flow of bleed air provided to various loads and provide the monitored value(s) as feedback to a controller that selectively opens/closes one or more valves to regulate the pressure and/or flow of bleed air.

If the flow/pressure of bleed air provided by the engine is too low (e.g., when the aircraft engine is idling on the ground), the valves being controlled by the controller may become saturated. The term "saturated" is used herein to refer to a condition in which a valve is fully opened, but feedback indicates that the valve should be opened further to increase the flow/pressure of bleed air. Because the valve cannot be opened any further, the valve is said to be saturated and control algorithms used to regulate the pressure/flow of bleed air cannot provided further regulation. That is, the controller is no longer in control of the flow of bleed air. A bleed flow transient (caused for example, by an increase in engine thrust) combined with the saturated position of the flow control valve may result in undesirable transients for loads connected to receive bleed air. For example, such an event may lead to a transient overspeed condition (i.e., speed excursion) for an air cycle machine (ACM) employed as part of the ECS. Over time, these transient events can degrade the health of the attached loads such as the ACM.

SUMMARY

A valve control system includes a valve connected to regulate flow of a medium provided to an output and a sensor connected to monitor a feedback value associated with the medium. A controller modulates the valve based on a comparison of a reference value to the feedback value provided by the sensor. The controller detects saturation of the valve if the error between the monitored feedback value and reference value exceeds a threshold. In response to detected saturation, the controller reduces the reference value to a value less than the monitored feedback value.

DETAILED DESCRIPTION

The claimed invention provides a system and method of detecting valve saturation based on values already monitored by the controller to regulate delivery of a medium such as bleed air. In response to the detected saturation condition, the claimed invention corrects or de-saturates the valve by causing the valve to close slightly.

Figure 1:
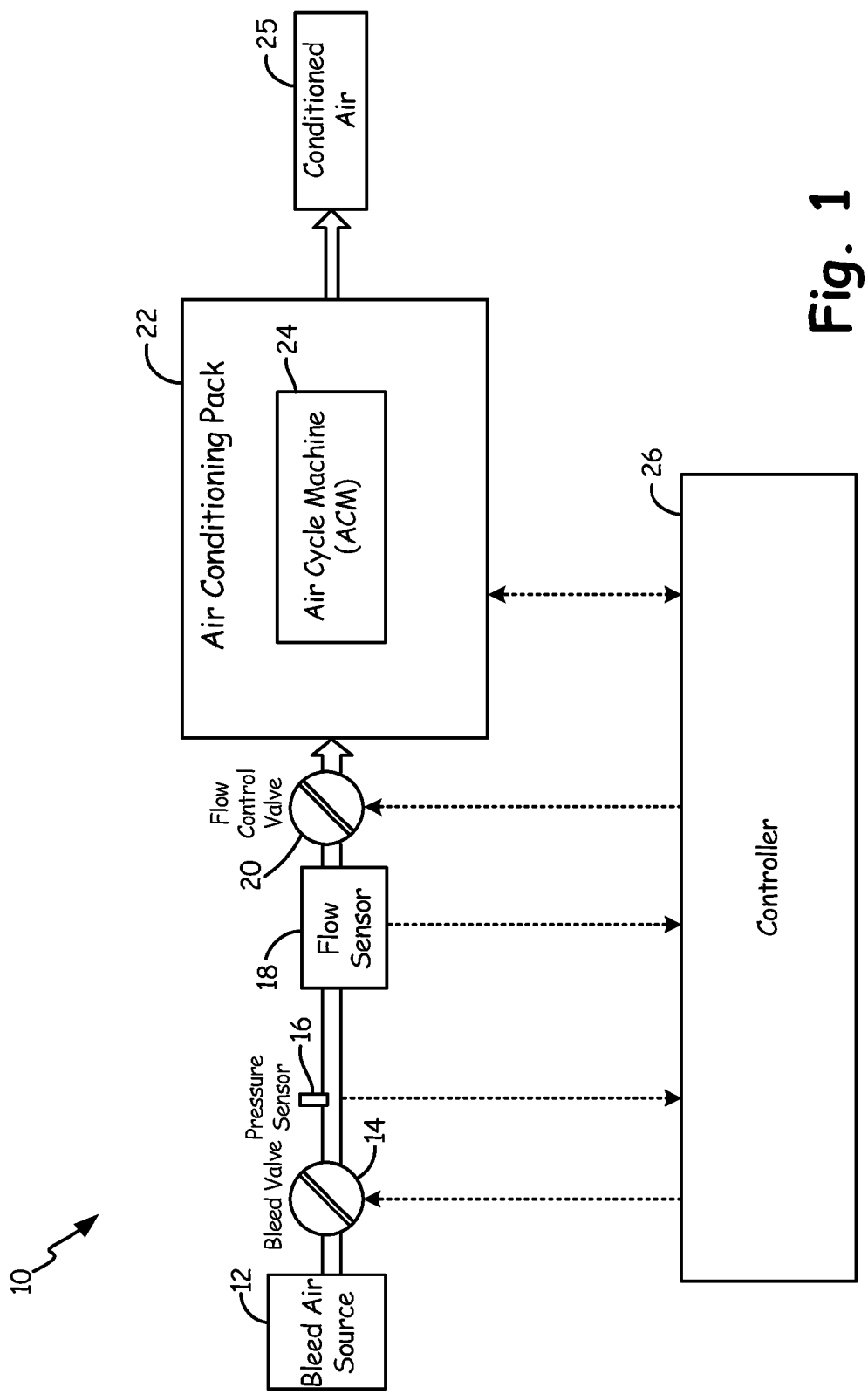
FIG. 1 is a block diagram illustrating flow control architectures according to an embodiment of the present invention.

FIG. 1 is a block diagram illustrating bleed air systems 10 according to an embodiment of the present invention. In the embodiment shown in FIG. 1, bleed air system 10 includes bleed air source 12, bleed valve 14, pressure sensor 16, flow sensor 18, flow control valve 20, air conditioning pack 22, air cycle machine 24, conditioned air output 25, and controller 26. Although the present invention is described with respect to a bleed air system employed on an aircraft, the present invention may be utilized in any application in which a valve is utilized to control the pressure/flow of a medium, either gas or liquid, and in which saturation of the valve is a potential issue.

In the embodiment shown in FIG. 1, bleed air source 12 is typically provided by engines on an aircraft. This may include both the main engines and the auxiliary power unit (APU), although transient bleed air events typically occur in combination with the main engines due to sudden increases in engine speed and therefore bleed airflow associated with the engines. The pressure and flow of bleed air provided via bleed air source 12 is based, in part, on the thrust provided by the main engines. For example, the pressure of the supplied bleed air decreases when the main engines are idling and increases as the speed of the engines increases. The flow of the supplied bleed air changes transiently with the pressure changes, increasing when the pressure increases and decreasing when the pressure decreases until the controller adjusts the flow control valve position to regulate flow. In addition the flow will decrease if the engine pressure results in the saturation of the flow control valve 20.

Controller 26 receives pressure feedback from pressure sensor 16 and flow feedback from flow sensor 18. Controller 26 controls bleed valve 14 based on the received pressure feedback to regulate the bleed air pressure provided from bleed valve 14 to flow control valve 20. Likewise, controller 26 controls flow control valve 20 based on the received flow feedback to regulate the flow provided to air conditioning pack 22.

In the embodiment shown in FIG. 1, flow control valve 20 provides a regulated flow of bleed air to air conditioning pack 22, which includes air cycle machine 24. Air conditioning pack 22, and in particular air cycle machine 24, are susceptible to transient bleed air events in which a sudden increase in the flow of bleed air combined with saturation of flow control valve 20 causes a corresponding increase in speed of air cycle machine 24. This sudden increase in speed in ACM 24 is referred to as an ACM speed excursion. Over time, speed excursions may result in damage to ACM 24. It should be recognized that air conditioning pack 22 represents one type of load for bleed air, and that in other embodiments other types of loads may be included to receive bleed air from flow control valve 20.

Flow sensor 18 monitors the flow of bleed air provided from bleed air source 12 to flow control valve 20, and provides the monitored flow as feedback to controller 26. In response to the monitored flow of bleed air, controller 26 utilizes a control algorithm (e.g., proportional-integral-derivative (PID) control) to selectively increase/decrease the flow of bleed air by opening/closing flow control valve 20. For example, controller 26 typically controls the position of flow control valve 20 by comparing the flow feedback value to a reference value that represents the desired flow of bleed air, wherein the control algorithm acts to minimize the difference between the feedback value and the reference value.

In addition to the typical control algorithm employed by controller 26 to regulate the flow of bleed air, controller 26 also monitors for saturation of flow control valve 20 and in response to detected saturation acts to de-saturate flow control valve 20. Flow control valve 20 becomes saturated when controller 26, in response to the monitored flow feedback decreasing below the reference value, fully opens flow control valve 20 but fails to increase the flow of bleed air relative to the reference value. When saturated, controller 26 cannot increase the flow of bleed air, and more problematic, as a result of the saturation is unable to respond quickly to sudden increases in bleed flow (i.e., pressure flow transients). Saturation of flow control valve 20 (or bleed valve 14) is not a failure of the valve itself, but rather a situation in which flow and/or pressure provided by an upstream source is less than expected and as a result cannot be regulated.

In one embodiment, controller 26 detects saturation of flow control valve 20 based on the error between the flow feedback value and the reference value used by the control algorithm, which represents the desired flow of bleed air. Typically, the difference between the feedback signal and reference value is small due to the regulation provided by controller 26. However, as the flow control valve 20 becomes saturated the difference or error between the values increases as controller 26 is unable to open the valve any further to increase the flow of bleed air through the valve. When the error value is greater than a threshold value, controller 26 determines that a saturation condition exists. To correct or de-saturate flow control valve 20, controller 26 decreases the reference value representing the desired flow of bleed air. In particular, by decreasing the reference value to less than the flow feedback value, the control algorithm employed by controller 26 will close flow control valve 20 slightly. In this way, flow control valve 20 is de-saturated and controller 26 regains "control" of flow control valve 20. A benefit of de-saturating flow control valve 20 is that the valve will provide faster response to any subsequent pressure transients due to engine throttle changes. Another benefit of the embodiment shown in FIG. 1, is that no additional inputs are required to detect saturation of flow control valve 20 other than those already being monitored to control the flow control valve.

In one embodiment, decreasing the reference value includes decreasing the reference value by a fixed amount less than the flow feedback signal to avoid a deadband sometimes employed in the control loop to avoid overshoot of the reference value. For example, if the flow feedback value is measured at 20 pounds per minute (ppm), with a deadband value of plus/minus 1 ppm, then the reference value may be set to 18 ppm. If a deadband is utilized in the valve's normal control loop, the reference must be outside of the deadband region (in this case, less than 19 ppm) in order for the control to drive the valve.

Subsequently, when the pressure and flow of bleed air provided by the engines has increased, the reference value could be increased or returned to the normal operating point representing the desired flow of bleed air. For example, in one embodiment the reference value is returned to the normal operating point when the aircraft is in the air, subsequent to the extreme throttle changes experienced during take-off.

In addition, controller 26 may also detect and correct saturation associated with bleed valve 14. As discussed above, during normal operation controller 26 receives a pressure feedback signal from pressure sensor 16 regarding the bleed air pressure provided by bleed valve 14, compares the pressure feedback signal to a pressure reference signal and provides a control signal to bleed valve 14 to minimize the error between the pressure feedback signal and the pressure reference signal. Saturation of bleed valve 14 is detected if the error between the pressure feedback signal and the pressure reference value exceeds a threshold value.

In response, controller 26 de-saturates bleed valve 14 by decreasing the pressure reference value to a value less than the pressure feedback signal. Modifying the reference value causes bleed valve 14 to close slightly, thereby de-saturating bleed valve 14. As discussed with respect to de-saturation of flow control valve 20, a benefit of de-saturating bleed valve 14 is that the valve will provide faster response to any subsequent pressure transients due to engine throttle changes.

In applications utilizing both bleed valve 14 and flow control valve 20, it may be beneficial to provide independent saturation detection and correction with respect to both valves. In other embodiments, it may be sufficient to provide saturation detection and correction with respect to just one of the two valves. Detecting and correcting saturation of bleed valve 14 and/or flow control valve 20 improves the ability of controller 26 to prevent pressure/flow transients from being communicated to air conditioning pack 22 (or similarly connected bleed air load).

Figure 2:
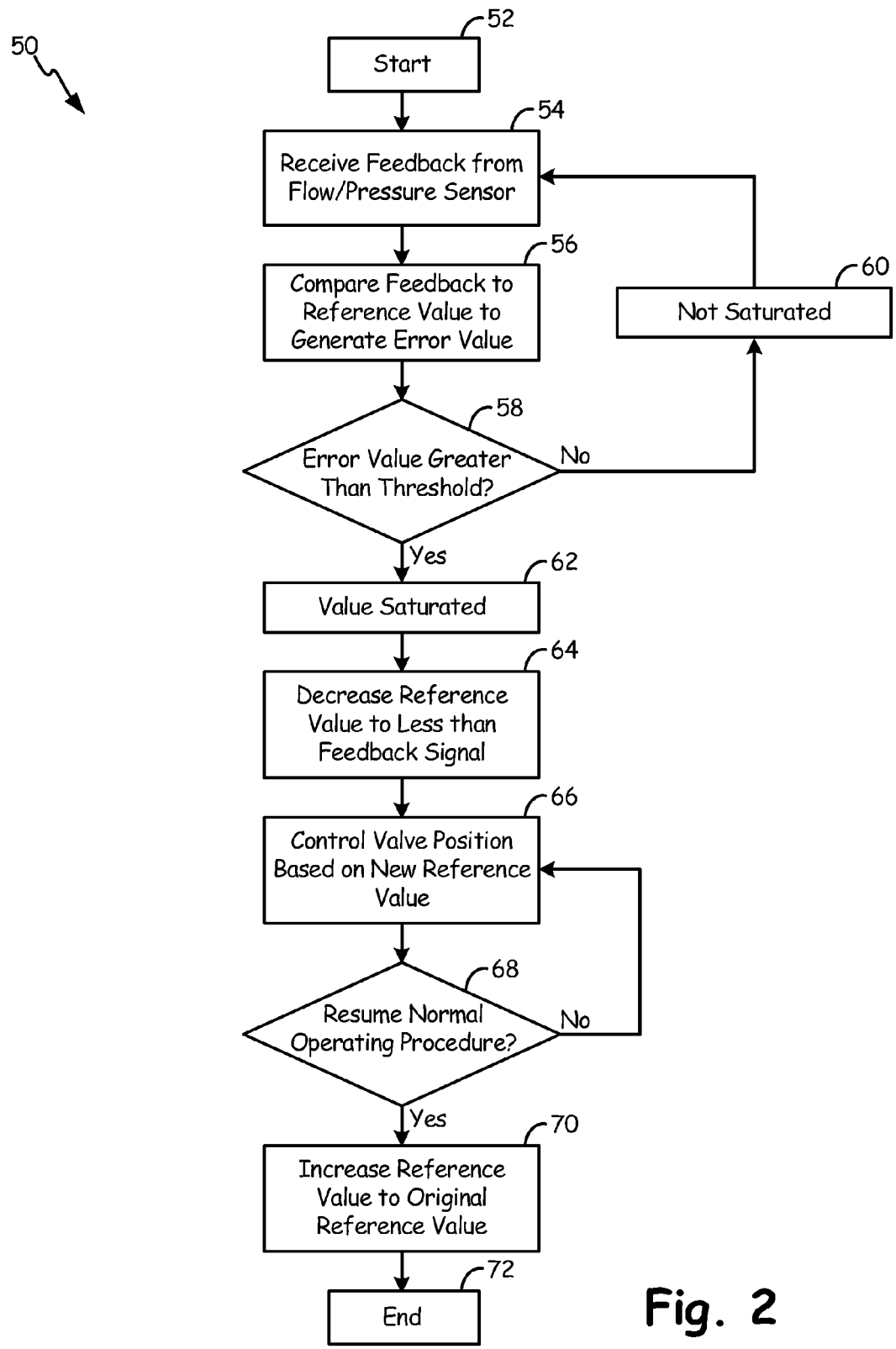
FIG. 2 is a flow chart illustrating a control algorithm utilized by a controller according to an embodiment of the present invention.

FIG. 2 is a flow chart illustrating control algorithm 50 utilized by controller 26 to detect saturation of bleed valve 14 and/or flow control valve 20 according to an embodiment of the present invention. Algorithm 50 starts at step 52, and may run in conjunction with the normal control algorithm utilized by the controller to control valve position. At step 54, the controller receives feedback from the flow/pressure sensor. At step 56, the controller compares the received feedback to a reference value to generate an error value (e.g., error_value=reference_value−feedback_value).

At step 58, the controller determines whether the calculated error value is greater than a threshold value. If not greater then the threshold value, then at step 60 the controller determines that the corresponding valve is not saturated, and the monitoring process continues at step 54. However, if the calculated error is greater than the threshold value, then at step 62 the controller determines that the valve is saturated.

At step 64 the controller de-saturates the valve by decreasing the reference value to a value less than the feedback signal. The controller may decrease the reference value to just less than the feedback signal if the control does not contain a deadband zone, or may decrease the reference value by a set amount less than the feedback signal to account for deadband zones. In one embodiment, the decrease in the reference value is nearly instantaneous, while in other embodiments the reference value is ramped down to a desired reference value. At step 66 the controller controls the valve based on the new reference value, which if less than the feedback signal results in the valve being closed slightly. As a result, the valve is back "under control" of the controller.

At step 68 the controller determines whether the normal operating procedure should resume, which includes returning the reference value to the original value. This determination is largely application specific. For example, in an aircraft application it would be appropriate to resume normal operating procedure when the aircraft has taken off and large thrust variants (typically occurring during take-off) are not likely. If normal operating procedure should not be restored, then at step 66 the valve continues to be controlled based on the new reference value. If normal operating procedures should be restored, then at step 70 the controller increases the reference value to the original reference value. The reference value may be instantaneously increased to the original reference value, or may be ramped up over a defined period of time to prevent sudden variations in valve position.

At step 72 the controller resumes normal operations. In some applications, this may include re-starting the algorithm at step 52. In other applications, such as on-board an aircraft, saturation of the valves may be unlikely after take-off and subsequent monitoring for saturation may not be required until the aircraft has landed.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of operating a flow control valve, the method comprising:
    receiving a feedback value associated with a medium provided through the flow control valve;
    generating an error value by comparing the monitored feedback value to a reference value;
    detecting saturation of the flow control valve if the error value is greater than a threshold;
    de-saturating the flow control valve by decreasing the reference value to a value less than the monitored feedback value; and
    modulating the flow control valve based on the decreased reference value.

2. The method of claim 1, wherein decreasing the reference value to a value less than the monitored feedback value includes decreasing the reference value to a value that is less than the feedback value and a deadband zone.

3. The method of claim 1, further including:
    increasing the reference value to an original value when the saturation condition ends.

4. The method of claim 1, wherein the medium is a gas.

5. The method of claim 1, wherein the medium is a fluid.

6. The method of claim 1, wherein the feedback value is a monitored pressure feedback value.

7. The method of claim 1, wherein the feedback value is a monitored flow feedback value.

8. A valve control system comprising:
    a valve connected to regulate flow of a medium provided to an output;
    a sensor connected to monitor a feedback value associated with the medium; and
    a controller connected to monitor the feedback value associated with the medium, regulate the valve based on a comparison of the feedback value to a reference signal, and detect saturation of the valve when an error between the feedback value and the reference signal exceeds a threshold value, wherein in response to detected saturation of the valve the controller decreases the reference signal to a value less than the feedback value.

9. The valve control system of claim 8, wherein when decreasing the reference signal to a value less than the monitored feedback value, the controller decreases the reference value to a value that is a fixed amount less than the feedback value.

10. The valve control system of claim 8, wherein the controller increases the reference value to an original value when the saturation condition ends.

11. The valve control system of claim 8, wherein the medium is a gas.

12. The valve control system of claim 8, wherein the medium is a fluid.

13. The valve control system of claim 8, wherein the sensor is a pressure sensor that provides a monitored pressure value as feedback.

14. The valve control system of claim 8, wherein the sensor is a flow sensor that provides a monitored flow value as feedback.

15. A bleed air valve system employed on an aircraft to provide bleed air to a load, the bleed air valve system comprising:
    a bleed valve connected to a bleed air source to regulate bleed air pressure;
    a pressure sensor connected to monitor a pressure feedback value associated with the bleed air provided by the bleed valve;
    a flow control valve connected to regulate flow of the bleed air provided to the load;
    a flow sensor connected to monitor a flow feedback value associated with the bleed air; and
    a controller connected to monitor the pressure feedback value and the flow feedback value, regulate the bleed valve based on a comparison of the pressure feedback value to a pressure reference value, regulate the flow control valve based on a comparison of the flow feedback value to a flow reference value, detect saturation of the bleed valve if an error between the pressure feedback value and the pressure reference signal exceeds a threshold value, and detect saturation of the flow control valve if an error between the flow feedback value and the flow reference signal exceeds a threshold value, wherein in response to detected saturation of the bleed valve the controller decreases the pressure reference signal to a value less than the pressure feedback value and in response to detected saturation of the flow control valve the controller decreases the flow reference signal to a value less than the flow feedback value.

16. The bleed valve system of claim 15, wherein the controller increases the pressure reference signal and/or the flow reference signal when the aircraft changes operating conditions.

17. The bleed valve system of claim 16, wherein the controller increases the pressure reference signal and/or the flow reference signal after aircraft takeoff.

* * * * *